(12) United States Patent
Joshi et al.

(10) Patent No.: US 10,823,055 B2
(45) Date of Patent: Nov. 3, 2020

(54) BYPASS DUCT LOUVER FOR NOISE MITIGATION

(71) Applicant: PRATT & WHITNEY CANADA CORP., Longueuil (CA)

(72) Inventors: Ninad Joshi, Brampton (CA); Sid-Ali Meslioui, Brossard (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 810 days.

(21) Appl. No.: 15/275,885

(22) Filed: Sep. 26, 2016

(65) Prior Publication Data

US 2018/0038279 A1  Feb. 8, 2018

Related U.S. Application Data (60) Provisional application No. 62/371,964, filed on Aug. 8, 2016.

(51) Int. Cl.
*F02C 6/08* (2006.01)
*F02C 7/045* (2006.01)

(52) U.S. Cl.
CPC ............ *F02C 6/08* (2013.01); *F02C 7/045* (2013.01); *F05D 2260/96* (2013.01)

(58) Field of Classification Search
CPC .... F02C 6/08; F02C 7/04; F02C 7/045; F02C 7/18; F02C 9/18; F05D 2260/96; F05D 2260/606; F05D 2250/51; F05D 2250/52; F05D 2240/12; F05D 2240/126; F05D 2240/127; F02K 3/06; F02K 3/075; F02K 1/386; B64D 33/02; B64D 2033/0226; F01D 17/105

USPC .......................................................... 60/785
See application file for complete search history.

(56) References Cited

U.S. PATENT DOCUMENTS

| | | | |
|---|---|---|---|
| 4,452,266 A * | 6/1984 | Ogino | B64C 23/06 137/15.1 |
| 6,050,527 A * | 4/2000 | Hebert | B64C 23/00 137/15.1 |
| 7,377,100 B2 | 5/2008 | Bruno et al. | |
| 7,717,667 B2 * | 5/2010 | Urbassik | F01D 11/24 415/1 |
| 7,862,293 B2 | 1/2011 | Olver | |
| 8,092,153 B2 | 1/2012 | Strecker et al. | |
| 8,307,943 B2 | 11/2012 | Klasing et al. | |
| 8,484,982 B2 | 7/2013 | Martensson et al. | |
| 8,578,700 B2 | 11/2013 | Khakhar | |
| 9,097,259 B2 | 8/2015 | Clemen | |
| 2009/0249623 A1 | 10/2009 | Holze | |

(Continued)

*Primary Examiner* — Jesse S Bogue
*Assistant Examiner* — Loren C Edwards
(74) *Attorney, Agent, or Firm* — Norton Rose Fulbright Canada LLP (57) ABSTRACT

A bleed air system is disclosed for a turbofan engine having a bypass duct. The bleed air system includes a bleed air conduit having an inlet end connected to the bypass duct and a bleed air flow control valve disposed downstream of the inlet end, and a louver assembly disposed within the opening at inlet end of the bleed air conduit. The louver assembly includes an airfoil-shaped louver blade which extends across the opening in a direction transverse to the flow direction within the bypass duct. A reinforcing rib is attached to the louver blade and extends across the louver assembly in a direction generally parallel to the flow direction.

20 Claims, 7 Drawing Sheets

(56) References Cited

U.S. PATENT DOCUMENTS

| | | | |
|---|---|---|---|
| 2010/0126182 A1* | 5/2010 | Hoover | F01D 17/105 60/785 |
| 2011/0202321 A1 | 8/2011 | Lung et al. | |
| 2013/0129516 A1 | 5/2013 | Lung et al. | |
| 2014/0338360 A1 | 11/2014 | Ronan et al. | |
| 2015/0176500 A1 | 6/2015 | Taylor-Tibbott | |
| 2015/0275757 A1 | 10/2015 | Turner et al. | |

* cited by examiner

BYPASS DUCT LOUVER FOR NOISE MITIGATION

TECHNICAL FIELD

The present disclosure relates generally to air systems for gas turbine engines, and more particularly to bleed air systems which extract air from a duct of the gas turbine engine.

BACKGROUND

Air bled from the bypass duct of a turbofan engine is used in aircraft air systems. This is typically done via an opening in a bypass duct wall which communicates with a bleed air duct, and a downstream bleed air flow control valve (e.g. a butterfly valve) within the bleed air duct that is used to control the air flow through the bleed air duct. Bleed air can accordingly be extracted from the bypass duct when required via such an opening, by opening the bleed air flow control valve.

In most small-to-mid sized turbofan engines, bleed air ducts are typically 3 to 7 inches in diameter and mounted orthogonal to the airflow passage through the bypass duct. Accordingly, the opening inlets to the bleed air ducts formed in the bypass duct wall are typically simply circular apertures of a similar size. Such bleed air ducts have however been found to generate unwanted noise, for example a sharp tonal-noise signature. The unwanted tonal-noise may be produced when air is bled from the bypass duct via the bleed duct openings and/or when no bleed air is being extracted from the bypass air and the downstream bleed air flow control valve (e.g. butterfly valve) is in its default-closed position. This may be caused, for example, by resonance and/or excitation vibration modes occurring either at the bleed inlet or downstream within the bleed duct.

Attempts to mitigate such unwanted tonal-noise have included inserting wire-meshes at the inlets to the bleed air ducts. However, the aerodynamic losses resulting from these solutions are undesirable. Attempts have also been made to provide scoop inlets to the bleed duct within the bypass duct, in an effort to minimize aerodynamic losses and flow rate drops within the bypass stream and bleed air duct, but noise issues have remained.

SUMMARY

There is therefore provided a bleed air system for a turbofan engine having a bypass duct with at least one bypass duct wall directing bypass airflow in a flow direction, the bleed air system comprising: a bleed air conduit having an inlet connected to the bypass duct and a bleed air flow control valve disposed downstream of the inlet, an opening in the bypass duct wall communicating with the inlet of the bleed air conduit when the bleed air flow control valve is open; and a louver assembly disposed within the opening at inlet of the bleed air conduit, the louver assembly including a airfoil-shaped louver blade extending across the opening in a direction transverse to the flow direction within the bypass duct, and a reinforcing rib attached to the louver blade and extending across the opening in a direction generally parallel to the flow direction, the louver blade and the reinforcing rib forming a cross-shaped louver structure fixed in place within the opening at the inlet of the bleed air conduit.

There is also provided a louver assembly adapted to be disposed within an opening of a duct in a gas turbine engine to extract air from the duct, the louver assembly comprising: a louver blade extending across the opening in a direction transverse to a flow direction within the duct, the louver blade having an airfoil shape and oriented in a constant angle of attack relative to the flow direction in the duct; and a reinforcing rib attached to the louver blade and extending perpendicularly relative to the louver blade.

There is further provided a gas turbine engine comprising an engine core including a fan assembly, a compressor assembly, a combustion gas generator assembly and a turbine assembly, and an annular bypass duct directing a bypass air flow therethrough that is driven by the fan assembly, the annular bypass air duct being defined between inner and outer bypass duct walls, a bleed inlet opening disposed in one of the inner and outer duct walls, the bleed inlet opening in fluid communication with a bleed air conduit extending downstream from the bleed inlet opening for extracting bleed air from the bypass duct, the bleed inlet opening having a louver assembly mounted therein, the louver assembly including a louver blade extending across the bleed inlet opening in a direction transverse to the bypass air flow within the bypass duct, the louver blade having an airfoil shape and oriented in a fixed angle of attack relative to the bypass air flow, the louver blade protruding partially into the bypass duct, and a reinforcing rib extending across the bleed inlet opening and attached to the louver blade, the reinforcing rib disposed perpendicularly relative to the louver blade and parallel to the bypass air flow.

There is alternately provided a bleed air system for a turbofan engine having a bypass duct with at least one bypass duct wall directing bypass airflow in a flow direction, the bleed air system comprising: a bleed air conduit having an inlet end connected to the bypass duct and a bleed air flow control valve disposed downstream of the inlet end, an opening in the bypass duct wall communicating with the inlet end of the bleed air conduit to permit bleed air extraction from the bypass duct via said opening when the bleed air flow control valve is opened; and a louver assembly disposed within the opening at inlet end of the bleed air conduit, the louver assembly including a fixed blade extending across the opening in a direction transverse to the flow direction within the bypass duct, the fixed blade having an airfoil shape, and a reinforcing rib extending across the opening and attached to the fixed blade, the reinforcing rib extending perpendicularly relative to the fixed blade and parallel to the flow direction.

There is alternately provided a louver assembly adapted to be disposed within an opening in a wall of a bypass duct of a turbofan engine, the opening communicating with a bleed air conduit extending downstream from the opening, the louver assembly comprising: a louver blade extending across the opening in a direction transverse to a bypass flow direction within the bypass duct, the louver blade having an airfoil shape and is oriented in a fixed angle of attack relative to the bypass flow direction, the louver blade protruding partially beyond an outer annular rim of the louver assembly, the outer annular rim adapted to be mounted flush with the wall of the bypass duct wall; and a reinforcing rib attached to the louver blade and extending perpendicularly relative to the louver blade and parallel to the bypass flow direction.

BRIEF DESCRIPTION OF THE DRAWINGS

Reference is now made to the accompanying figures in which.

DETAILED DESCRIPTION

Figure 1:
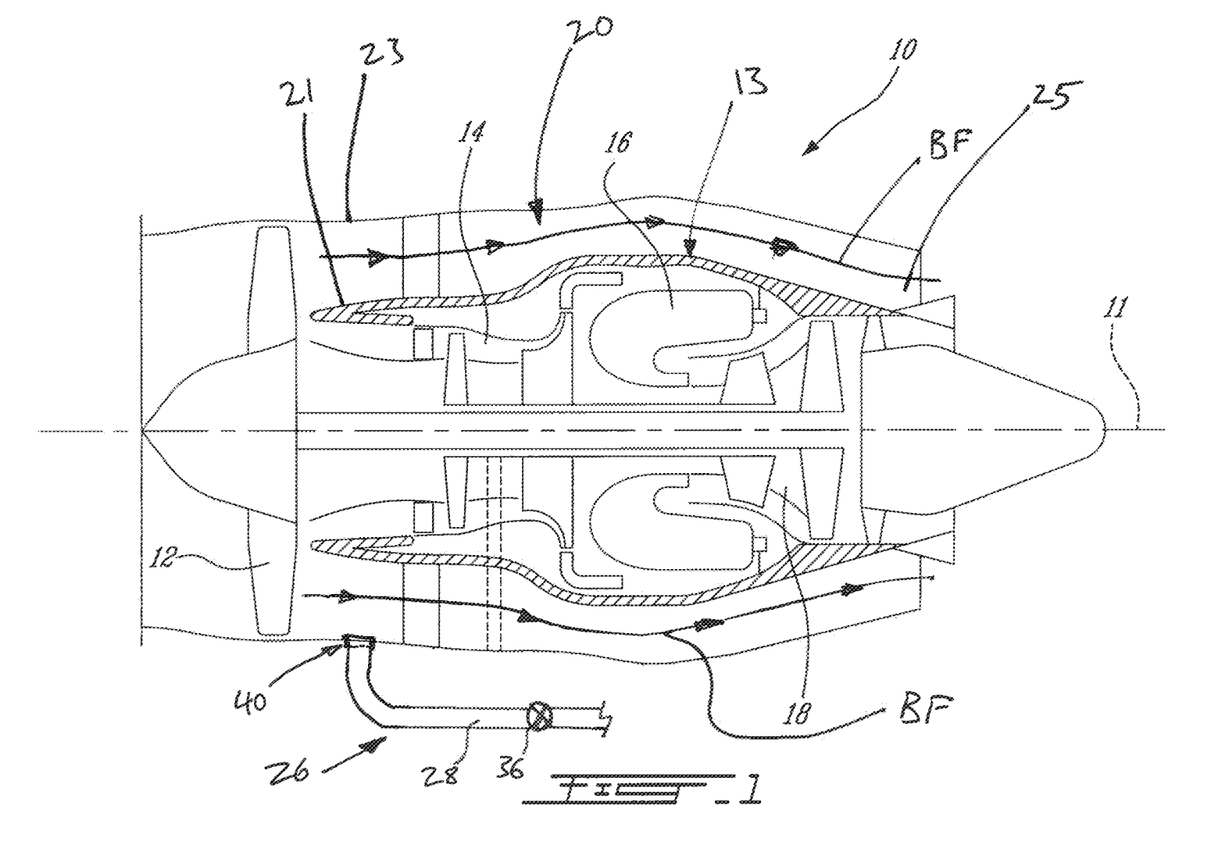
FIG. 1 is a schematic cross-sectional view of a gas turbine engine.

FIG. 1 illustrates a turbofan gas turbine engine 10 of a type preferably provided for use in subsonic flight, generally comprising an engine core 13 having in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A centerline axis 11 extends longitudinally through the engine 10, about which the compressor and turbine rotors rotate. The directional terms "axial" and "radial" as used herein are understood to be relative to this longitudinal centerline axis 11.

The turbofan engine 10 is a bypass gas turbine engine and therefore includes an annular bypass duct 20 that surrounds the core 13 of the engine 10 and is defined between inner bypass duct wall 21 and outer bypass duct wall 23. A stream of bypass air, compressed by the upstream fan 12, is directed through the annular bypass duct 20 and discharged at the aft end 25 thereof to produce thrust.

Figure 2:
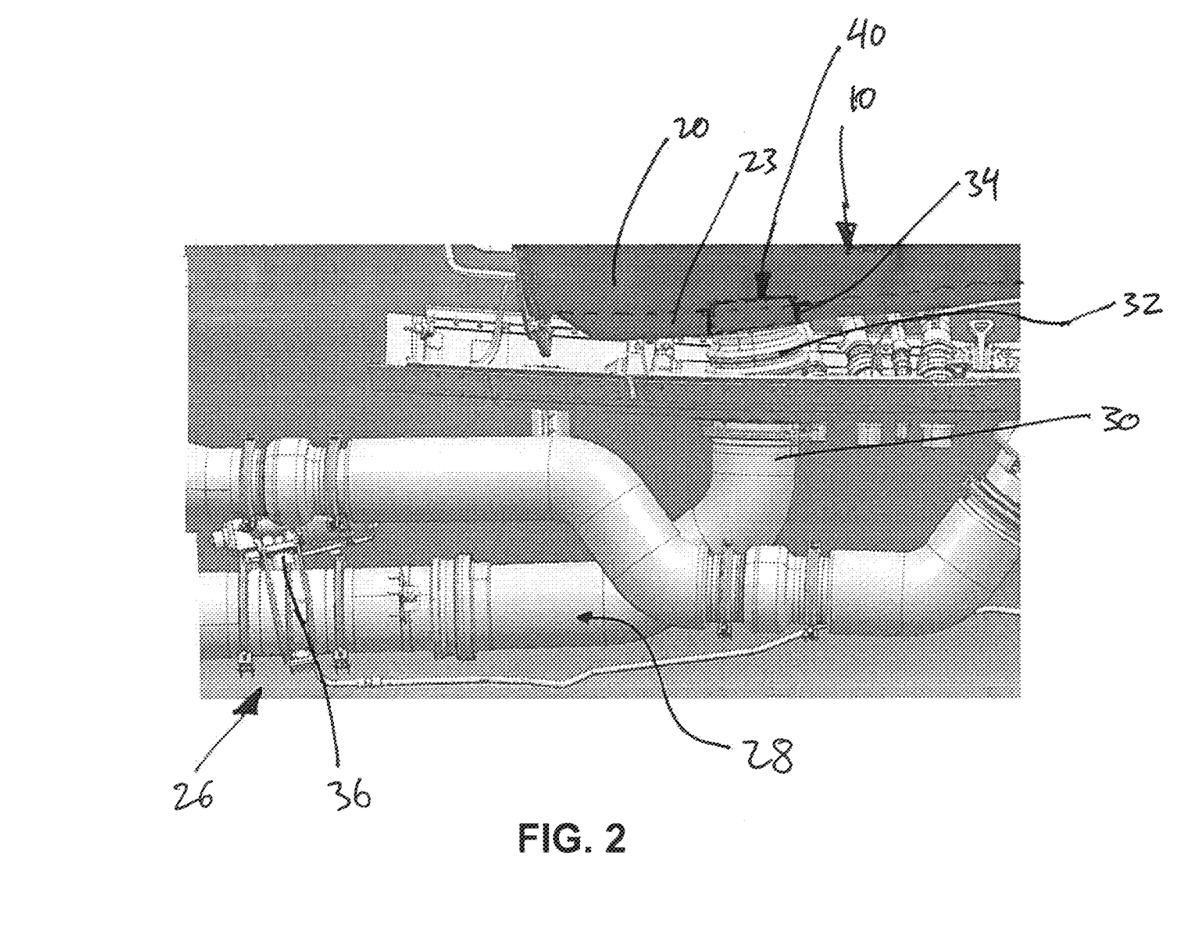
FIG. 2 is a partial side elevational view of the gas turbine engine of FIG. 1, showing the bypass duct and components of the bleed air system.

Referring now to FIG. 2, the turbofan engine 10 includes a bleed air system 26 which is operable, among other things, to bleed compressed air from within the bypass duct 20 for use in aircraft air systems or secondary air systems of the engine itself.

The bleed air system 26 includes a bleed air conduit 28 having an inlet end 30 connected to the one of the inner and outer walls 21, 23 of the bypass duct 20. In the embodiment of FIG. 2, the inlet end 30 of the bleed air conduit is connected to the outer wall 23 of the bypass duct 20 such than an opening 34 in the outer wall 23 of the bypass duct 20 is aligned with a corresponding opening at the inlet end 30 of the bleed air conduit 28. An intermediate connector 32, such as a corrugated pipe for example, may also be used between the inlet end 30 of the bleed air conduit 28 and the outer wall 23 of the bypass duct 20. Regardless, the bleed air conduit 28 is connected in fluid flow communication with the bypass duct 20, such that bypass air flowing within the duct 20 in bypass flow direction BF can be extracted from the bypass duct 20 and into the bleed air conduit 28, via the opening 34. The opening 34 in the outer bypass duct wall 23 therefore fluidly communicates with the inlet end 30 of the bleed air conduit 28 to permit bleed air extraction from the bypass duct 20 via said opening 34.

The bleed air system 26 also includes a bleed air flow control valve 36 located within or connected to the bleed air conduit 28. The bleed air flow control valve 36 is disposed downstream from the inlet end 30 of the bleed air conduit 28, and is operable to open and close, thereby respectively either allowing or blocking flow through the bleed air conduit 28. The bleed air flow control valve 36 may, for example, be a butterfly type valve that is remotely actuated. The normal position of the bleed air flow control valve 36 is in the closed position. When actuated, the valve 36 opens, thereby permitting bypass air flowing in direction BF within the bypass duct 20 to be extracted therefrom, via the opening 34, and drawn through the bleed air conduit 28.

A louver assembly 40 is disposed within the opening 34 in the outer wall 23 of the bypass duct 20, at the inspection of the bleed air conduit 28 and the bypass duct 20. The louver assembly 40 may be mounted within the inlet end 30 (or the intermediate connecting corrugated pipe 32) of the bleed air conduit 28, and is fixed in place to one or both of the bypass duct 20 and the bleed air conduit 28.

Referring now to FIGS. 3 to 6B, the louver assembly 40 will now be described in further detail.

Figure 3:
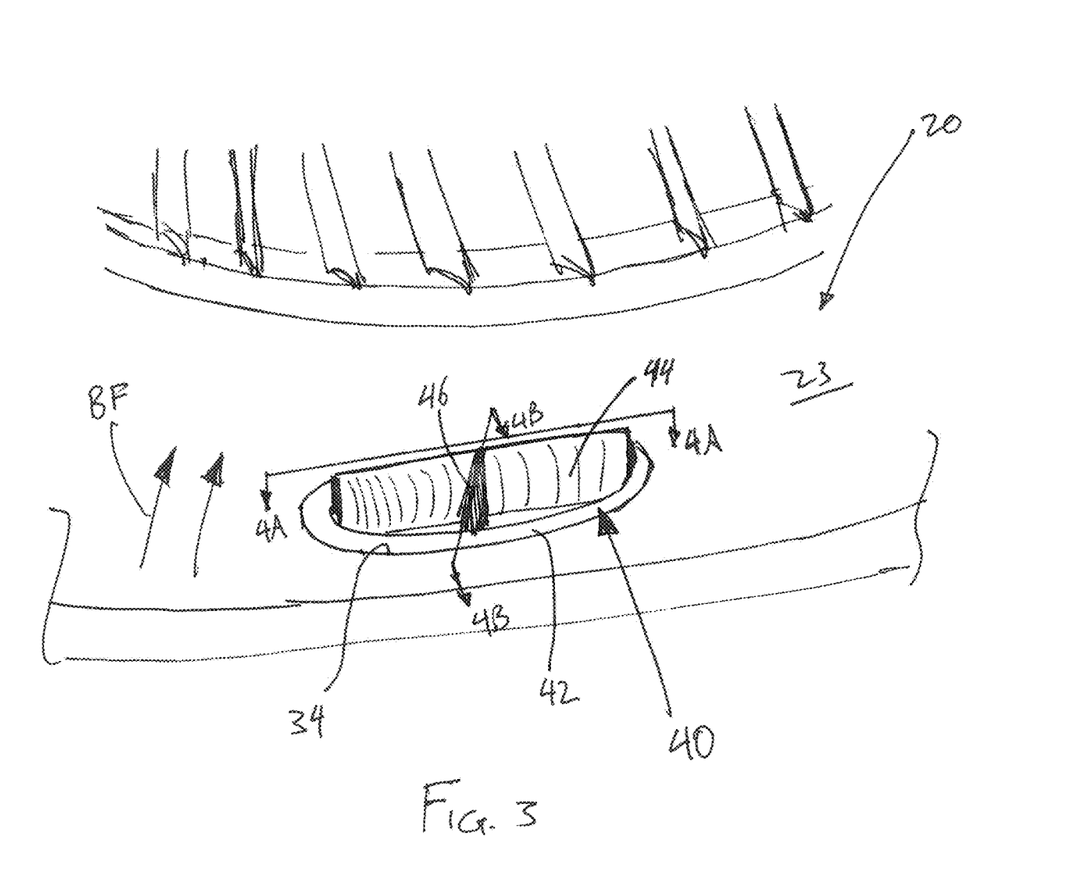
FIG. 3 is a partial front perspective view from within the bypass duct of FIG. 2, looking downstream from the fan and showing an inlet to the bypass bleed duct of the bleed air system having a louver in accordance with the present disclosure.

As seen in FIG. 3, the louver assembly 40 is mounted within the opening 34 in the outer wall 23 of the bypass duct 20. While the opening 34, and thus the louver assembly 40 therewithin, may be disposed at a number of axial positions with the bypass duct 20 downstream of the fan 12 (see FIG. 1), in the depicted embodiment the louver assembly 40 is positioned immediately downstream of the fan, upstream of any further elements within the bypass duct 20 such as struts, guide vanes, coolers, etc.

The louver assembly 40 has an outer perimeter rim 42 that fits cooperatively within the opening 34 in the bypass duct 20. In the depicted embodiment, the opening 34 and therefore the outer perimeter rim 42 of the louver assembly 40 are substantially circular in shape. A louver blade 44 extends across the louver assembly 40, within the outer perimeter rim 42, in a direction substantially transverse to the bypass air flow direction BF flowing within bypass duct 20. Accordingly, the louver blade 44 also extends across the opening 34 in this transverse direction.

The transversely extending louver blade 44 of the louver assembly 40 has an airfoil shape, defining a leading edge 45 of the airfoil at the uppermost edge of the louver blade 44. The transversely extending louver blade 44 of the louver assembly 40 is fixed in position within the outer perimeter rim 42, and therefore the louver blade 44 is a fixed blade (i.e. its position and/or orientation cannot be modified once the louver assembly 40 is disposed in position). Given that the louver blade 44 forms an airfoil shape, this also means that the airfoil-shaped louver blade 44 is also oriented at a constant angle of attack θ relative to an axis 49 normal to the surface of the bypass duct wall 23 and therefore substantially normal to the direction of bypass air flow BF through the bypass duct. In one particular embodiment, this constant angle of attack of the fixed louver blade 44 is selected to be between 10 and 20 degrees. In a more specific embodiment, the louver blade 44 is provided with an angle of attack θ of about 15 degrees.

Figure 6A:
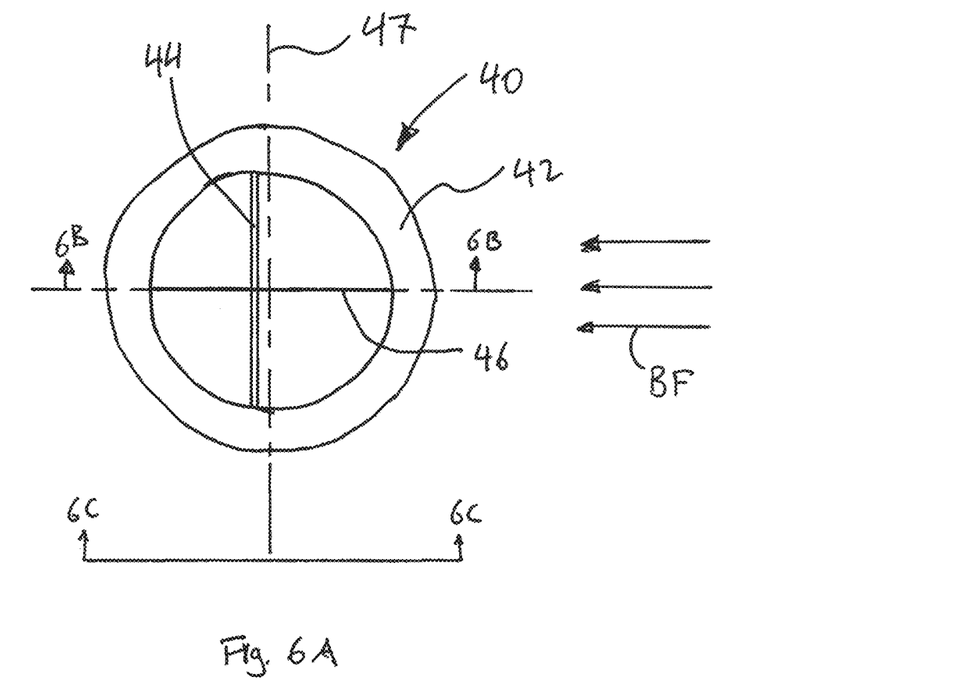
FIG. 6A is a bottom plan view of the louver of FIG. 5.
Figure 6B:
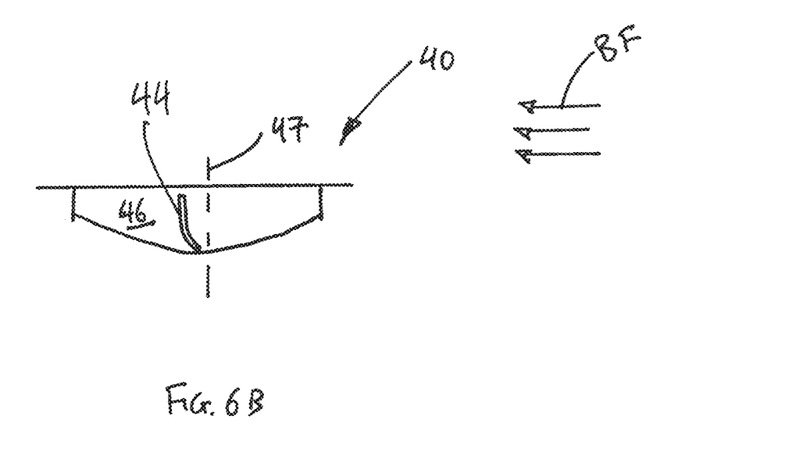
FIG. 6B is cross-sectional view of the louver of FIG. 5, taken through line 6B-6B of FIG. 6A.
Figure 6C:
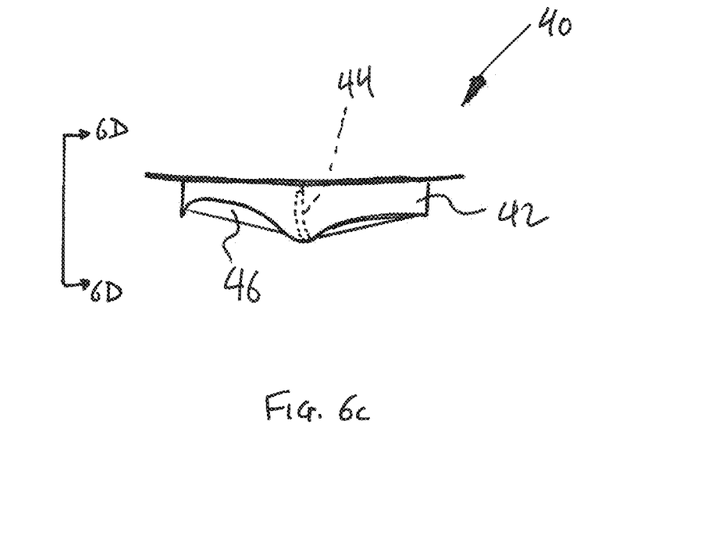
FIG. 6C is a side elevational view of the louver of FIG. 5, as seen from line 6C-6C in FIG. 6A.
Figure 6D:
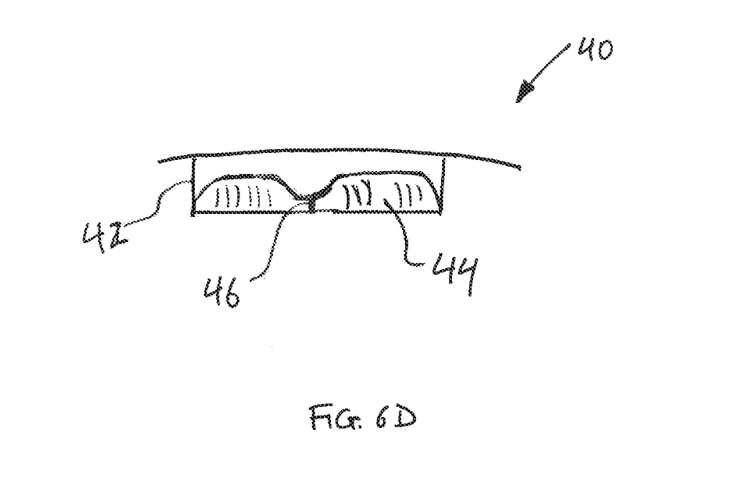
FIG. 6D is a front elevational view of the louver of FIG. 5, as seen from line 6D-6D of FIG. 6C.

As best seen in FIGS. 6A to 6B, the transversely extending airfoil-shaped louver blade 44 is axially, i.e. stream-wise relative to the direction of bypass airflow BF, offset from a transversely extending centerline plane 47 passing through a center of the circular louver assembly 40. More particularly, the louver blade 44 is positioned slightly downstream from this transversely extending centerline plane 47.

Figure 4A:
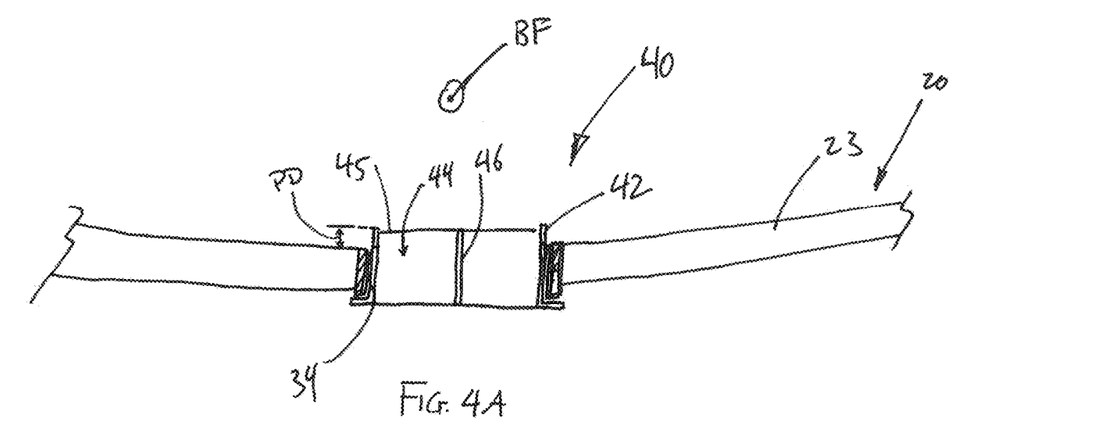
FIG. 4A is a cross-sectional view of the louver at the inlet to the bypass bleed duct, taken through line 4A-4A of FIG. 3.
Figure 4B:
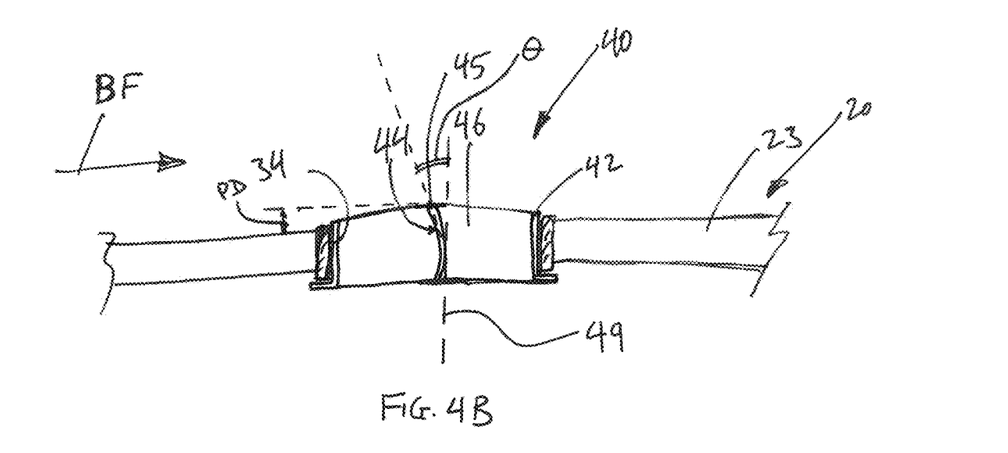
FIG. 4B is a cross-sectional view of the louver at the inlet to the bypass bleed duct, taken through line 4B-4B of FIG. 3.
Figure 5:
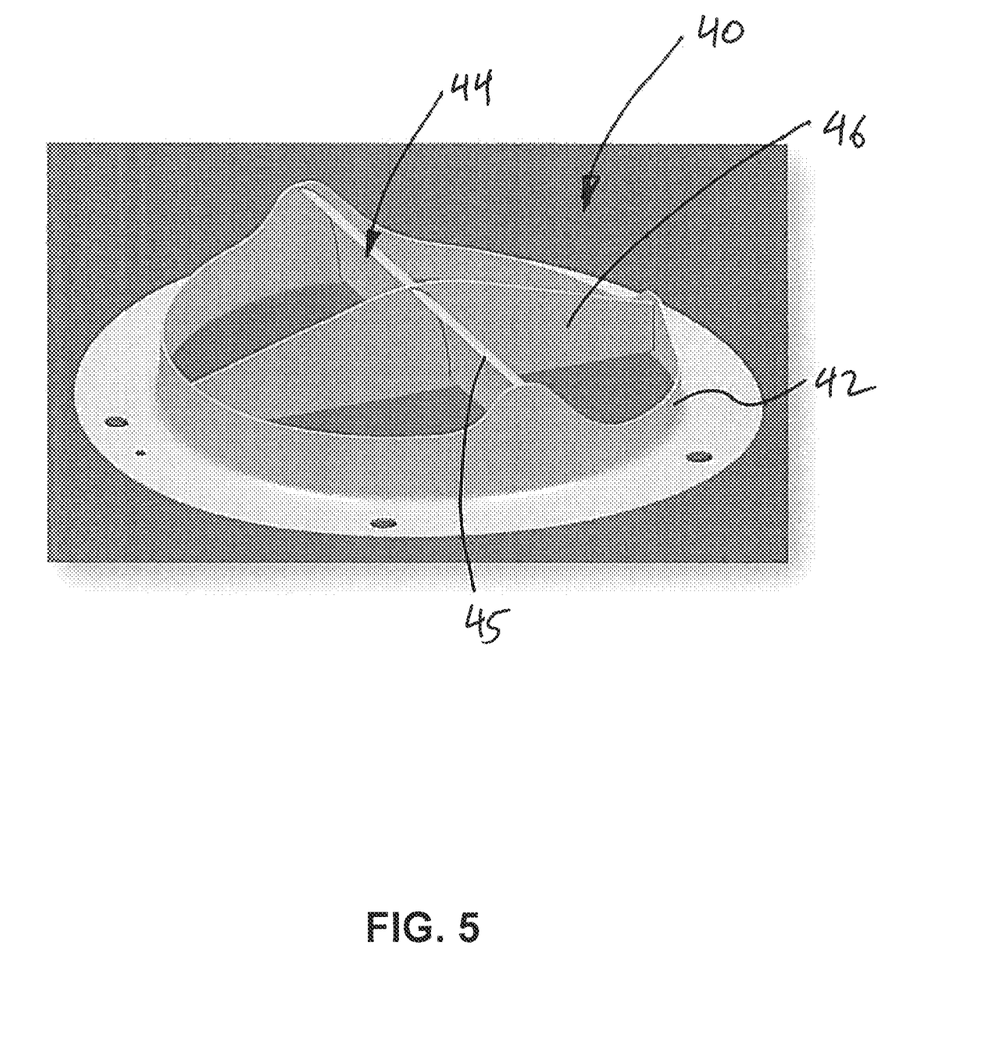
FIG. 5 is a perspective view of the louver of FIGS. 3 to 4B, shown in isolation.

Referring back to the embodiment depicted in FIGS. 4A to 4B, at least a portion of the louver blade 44, including the leading edge 45 thereon, protrudes into the bypass duct 20. However, this is not necessary, and in an alternate embodiment the leading edge 45 of the blade 44 is instead recessed within the outer peripheral rim 42 of the louver assembly 40. In one particularly embodiment wherein the louver blade 44 is positioned such as to protrude into the bypass duct, the louver blade 44 protrudes into the bypass duct a penetration distance PD of from 0.1 to 0.3 inches relative to the air-facing surface of the bypass duct wall 23. More particularly, in another specific embodiment, this penetration distance PD is selected to be about 0.15 inches. This penetration of the louver blade 44 into the bypass duct 20, along with the afore-mentioned angle of attack θ of the airfoil shaped blade 44, may further help the louver assembly 40 to redirect bypass air flowing in the bypass air flow direction BF within the bypass duct 20 into the bleed air conduit 28.

As seen in each of FIGS. 3 to 6B, the louver assembly 40 also includes a reinforcing rib 46 that extends across the outer peripheral rim 42 of the assembly and thus across the corresponding span (e.g. diameter, in the case of a circular opening) of the opening 34 in the bypass duct wall 23. This reinforcing rib 46 extends perpendicularly relative to the transversely extending louver blade 44, and therefore the reinforcing rib 46 extends substantially parallel to the direction of bypass airflow BF. The reinforcing rib 46 is attached to, and is therefore disposed in fixed engagement with, the transversely extending louver blade 44. The reinforcing rib 46 may be planar (formed by flat sheet metal, for example) and, in at least one embodiment, extends the full cord-wise length of the airfoil shaped louver blade 44.

The perpendicularly arranged louver blade 44, extending transversely to the flow direction, and the reinforcing rib 46, extending parallel to the flow direction, may thereby forming a cross-shaped structure that is fixed in place within the outer perimeter rim 42 or flange of the louver assembly 40 and therefore within the opening 34 in the bypass duct wall 23 and the inlet end of the bleed air conduit 28. In the depicted embodiment, the reinforcing rib 46 is bisects the louver blade 44 at a transverse mid-point thereof, thereby forming a cross having four cross segments of substantially equal length. As such, the reinforcing rib 46 is centrally positioned relative to the total transverse width of the louver blade 44.

The reinforcing rib 46 and the louver blade 44 may be originally separately formed before being fastened together during manufacturing of the louver assembly 44, such as by welding, brazing or the like. Alternately, however, the louver blade 44 and the reinforcing rib 44 are integrally and simultaneously formed with each other, such as by molding, casting, 3D printing, or the like.

The reinforcing rib 46 that is fixed to the transversely extending louver blade 44, provides structural integrity to the louver blade 44 and the louver assembly 40, which may help to reducing the likelihood of premature failure of the assembly due to large aerodynamic loads and/or aerodynamic excitation at the entry of the bleed air conduit 28.

The louver assembly 40 as described herein may accordingly help to reduce any broadband noise generated by the louver assembly 40, under both operative (i.e. the control valve 36 of the bleed air system 26 is open to bleed air from the bypass duct 20) and inoperative (i.e. the control valve 36 of the bleed air system is closed and no bypass air is being bled from the bypass duct) conditions. The levels of unwanted broadband noise and/or tonal noise produced by the presence of the bleed air system may therefore be reduced. The overall noise signature of the engine 10 may thus be reduced.

The configuration of the louver assembly 40 as described herein may accordingly help to contribute to noise reduction, due to both the structural reinforcement and the greater turbulence caused by the combined cross-shaped structure formed by the transverse louver blade 44 & reinforcing rib 46. The greater turbulence caused in the bleed airflow may acts to create regions of low pressure downstream from the louver, which reduces noise generated when air is bleed through the bleed duct.

The above description is meant to be exemplary only, and one skilled in the art will recognize that changes may be made to the embodiments described. Still other modifications which fall within the scope of the present invention as claimed will be apparent to those skilled in the art, in light of a review of this disclosure, and such modifications are intended to fall within the appended claims.

The invention claimed is:

1. A bleed air system for a turbofan engine having a bypass duct extending around a central axis, the bypass duct having at least one bypass duct wall directing bypass airflow in a flow direction, the bleed air system comprising: a bleed air conduit having an inlet connected to the bypass duct and a bleed air flow control valve disposed downstream of the inlet, an opening in the bypass duct wall communicating with the inlet of the bleed air conduit when the bleed air flow control valve is open; and a louver assembly disposed within the opening in the bypass duct wall at the inlet of the bleed air conduit, the louver assembly including an airfoil-shaped louver blade extending across the opening in a direction transverse to the flow direction within the bypass duct and having a portion protruding into the bypass duct by from 0.1 to 0.3 inches relative to the bypass duct wall, the portion including a leading edge of the airfoil shaped louver blade, and a reinforcing rib attached to the louver blade and extending at least axially across the opening relative to the central axis, the louver blade and the reinforcing rib forming a cross-shaped louver structure fixed in place within the opening at the inlet of the bleed air conduit, the reinforcing rib intersecting both of a pressure side and a suction side of the louver blade.

2. The bleed air system of claim 1, wherein the reinforcing rib bisects the louver blade at a transverse midpoint thereof.

3. The bleed air system of claim 1, wherein the reinforcing rib is planar.

4. The bleed air system of claim 1, wherein the opening in the bypass duct wall is circular.

5. The bleed air system of claim 1, wherein the louver assembly includes a single louver.

6. The bleed air system of claim 1, wherein the portion of the louver blade protrudes into the bypass duct 0.15 inches.

7. The bleed air system of claim 1, wherein the louver blade having the airfoil shape is positioned at a constant angle of attack relative to the flow direction.

8. The bleed air system of claim 7, wherein the angle of attack of the louver blade is between 10 and 20 degrees.

9. The bleed air system of claim 8, wherein the angle of attack of the louver blade is 15 degrees.

10. The bleed air system of claim 1, wherein the louver blade is offset from a transversely extending centerline axis passing through a center of the louver assembly.

11. The bleed air system of claim 10, wherein the louver blade is positioned downstream from the transversely extending centerline axis.

12. A louver assembly adapted to be disposed within an opening of a duct in a gas turbine engine to extract air from the duct, the louver assembly comprising: an annular outer rim; a louver blade extending across the opening in a direction transverse to a flow direction within the duct, the louver blade having an airfoil shape and oriented in a constant angle of attack relative to the flow direction in the duct, a portion of the louver blade protruding partially beyond the annular outer rim into the duct, said portion including a leading edge of the louver blade and protruding by from 0.1 to 0.3 inches beyond the outer annular rim; and a reinforcing rib attached to the louver blade and extending perpendicularly relative to the louver blade.

13. The louver assembly of claim 12, wherein the louver blade and the reinforcing rib form a cross-shaped louver structure fixed in place within the opening at an inlet end of a bleed air conduit.

14. The louver assembly of claim 13, wherein the reinforcing rib is planar and bisects the louver blade at a transverse midpoint thereof.

15. The louver assembly of claim 12, wherein the annular outer rim defines a rim opening being circular.

16. The louver assembly of claim 12, wherein the constant angle of attack is between 10 and 20 degrees.

17. The louver assembly of claim 12, wherein the louver blade is offset from a transversely extending centerline axis passing through a center of the louver assembly.

18. The louver assembly of claim 17, wherein the louver blade is positioned downstream from the transversely extending centerline axis.

19. The louver assembly of claim 12, wherein the louver assembly includes a single louver blade.

20. A gas turbine engine comprising an engine core including a fan assembly, a compressor assembly, a combustion gas generator assembly and a turbine assembly, and an annular bypass duct directing a bypass air flow therethrough that is driven by the fan assembly, the annular bypass duct being defined between inner and outer bypass duct walls, a bleed inlet opening disposed in one of the inner and outer duct walls, the bleed inlet opening in fluid communication with a bleed air conduit extending downstream from the bleed inlet opening for extracting bleed air from the bypass duct, the bleed inlet opening having a louver assembly mounted therein, the louver assembly including a louver blade extending across the bleed inlet opening in a direction transverse to the bypass air flow within the bypass duct, the louver blade having an airfoil shape and oriented in a fixed angle of attack relative to the bypass air flow, a distance between a leading edge of the louver blade and the one of the inner and outer duct walls being from 0.1 to 0.3 inches, and a reinforcing rib extending across the bleed inlet opening and attached to the louver blade, the reinforcing rib disposed perpendicularly relative to the louver blade and parallel to the bypass air flow.

* * * * *